UNITED STATES PATENT OFFICE.

DAVID N. CARVALHO, OF NEW YORK, N. Y., ASSIGNOR TO HIMSELF AND ERNEST MARX, OF SAME PLACE.

METHOD OF PRODUCING PHOTOGRAPHIC IMAGES.

SPECIFICATION forming part of Reissued Letters Patent No. 9,384, dated September 21, 1880.

Original No. 225,458, dated March 16, 1880. Application for reissue filed June 10, 1880.

*To all whom it may concern:*

Be it known that I, DAVID NUNES CARVALHO, of the city, county, and State of New York, have invented a new and useful Improvement in Producing Photographic Images, of which the following is a specification.

This invention relates to an improved method of producing photographic images, by which the time of exposure is shortened and rendered less annoying to the sitter, and by which superior negatives and positives are obtained, in which the high lights are stronger and the shadows softer, and by which, furthermore, less retouching is required than by the ordinary methods in use.

One of the main objects of the photographic art has been to produce with short exposure a full-timed negative. A number of complicated chemical processes have been devised for this purpose; but they have for some reason or other failed to give entire satisfaction, and have not worked to advantage.

The object of my invention is to supply to the photographer a simple but very effective method by which he is enabled to obtain with the common ordinary appliances and with a very short exposure a superior and full-timed negative. This result I have obtained mainly by the operation of optical means, by discarding, in the first place, the hitherto generally adopted blue, black, or neutral colors for the interior of the photographic galleries, and substituting therefor a color that reflects rays of non-actinic quality; secondly, by employing for the sensitive film or coating of the glass plate collodion or other substratum of a color complementary to the predominating color of the surroundings; and, lastly, by interposing between the object to be photographed and the reflecting walls or screen an opaque body or intercepter, by which means rays of a color complementary to the color of the surroundings and of an actinic character are thrown upon that side of the object not exposed to the direct light, so that from the shadow side actinic rays are transmitted toward the sensitized plate, so as to shorten exposure and render the shadows less dense.

In the search for a quicker process of producing photographic pictures I discovered that by working under a skylight glazed with uncolored glass, in a studio the walls of which had been painted in a brown color, it took considerably less time to make a negative than was required in the same room when the walls were painted with the orthodox blue color of photographic fame. In following up these experiments I discovered that by employing colors the reflected rays of which were supposed to have little or no actinic power the time of exposure required for a full-timed negative was more and more reduced.

According to the laws of optics, an opaque body of a certain color, when exposed to light, absorbs the rays of its complementary color, but reflects rays of its own color. The above experiments led me to suppose that the blue rays reflected by the common blue color of the studios were instrumental in retarding instead of accelerating the formation of the picture on the sensitized plate, owing to the disturbing influence of the reflected blue rays on the rays reflected from the object to the plate. Thus the blue color heretofore used in the rooms, instead of shortening the exposure, exerted an unfavorable influence and prolonged the time of exposure.

By employing, therefore, a color the reflected rays of which are supposed to be non-actinic these rays would exert no disturbing influence on the object to be photographed. In other words, the rays which are reflected from the object on the sensitized plate exert their full actinic power thereon, and produce, consequently, a better picture in less time. It is also well known that the violet and violet-indigo rays of the spectrum are the most actinic, possessing in the highest degree the power by which chemical changes are produced. A color complementary to violet would consequently reflect rays of least actinic power; and a paint of such complementary color, when used for the interior of the photographic galleries, instead of exerting a disturbing influence, would furnish reflected rays of non-disturbing character and admit the quicker and more perfect development of the image on the sensitized plate, owing to the diminished interference of the reflected rays with the rays thrown from the object on the sensitized plate. I obtained the complementary color of violet by mixing Prussian blue and deep chrome in certain proportions, which mixture has a greenish-orange hue or tint and resembles somewhat an orange pea-green. By applying a paint or other covering of this color to the interior of the skylight-room, excepting the glass, a full-timed negative was obtained with a considerable reduction of exposure as compared to the blue, brown, or other colors heretofore employed.

The good effects of the orange pea-green paint, by which the interior walls, joiner-work, &c., of the skylight-room were coated, induced me to continue my experiments with a view to still further shortening the time of exposure. I employed variously-colored collodions and baths, and found that by using a collodion and silver bath of a violet color complementary to the orange pea-green of the room the plate became more sensitive to the light. This is accomplished by coating the negative-plate with a film of violet-colored collodion, after which the plate is sensitized in the usual manner in a bath which is also of violet color. It is then exposed to the action of the light in the camera. The conjunction of the complementary colors of the walls, background, screens, and other accessories and of the sensitized plate neutralized the disturbing influences heretofore experienced and accelerated the chemical action of the rays reflected from the object to be photographed in such a manner that under favorable circumstances a full-timed negative was obtained by an instantaneous exposure merely, while under less favorable circumstances an exposure of a few seconds only was required. This favorable result, which is obtained simply by optical means, becomes more apparent when, in contradistinction to the complementary violet, a collodion and bath of the color of the room—say orange pea-green—is used, in which case, with the longest exposure and under most favorable conditions, only a dim outline of the object photographed was produced, no shadows whatever appearing, and only slight indications on the light side. Besides the reduction in the time of exposure, it was found that the use of the orange-pea-green color for the interior of the studio was less trying to the eyes of the sitter, which is readily explained by the fact that it contains green—the restoring color. The eye rests upon this photographic color with a feeling of satisfaction, and thus renders the sitting less objectionable than heretofore with the blue or gray color of the interior.

The absence of disturbing influences, such as cross-lights, dense shadows, &c., simplifies the work of the operator, and enables him to produce with almost instantaneous exposure superior negatives in which the high lights are more positive and the shadows softer.

The image is developed in the ordinary manner, and the negative blue obtained retains its violet color, so that the silver-paper used for printing purposes is more quickly affected by the light, and thereby a main desideratum of photographers—viz., a shortening of exposure and a saving of time in printing—obtained by cheap and exceedingly simple means.

In making photographic images there is no difficulty in bringing out that side of the object which is exposed to the direct transmitted light; but the trouble comes in on the shadow side, which requires for bringing it out properly a prolongation of exposure. Heretofore a blue color employed for the interior of the studio and the screen used by photographers for the purpose of throwing reflected light on the shadow side of the object was thought to be advantageous, when, in fact, the interposition of the screen caused the intercepting of the actinic blue rays reflected by the walls of the studio and the throwing upon the shadow side of the object rays of a color complementary to the blue color of the walls—namely, orange, which is non-actinic. This non-actinic effect prolonged instead of shortened the time necessary for exposure. This is reversed by the use of a non-actinic color for the interior of the studio, as in this case the opaque body, consisting of a screen or intercepter, throws a shadow of a complementary—that is, of a violet—color on that side of the sitter which is not exposed to the direct transmitted light.

The actinic character of the rays thrown by the screen or intercepter upon the shadow side of the sitter when the screen is properly placed between the sitter and the colored walls accelerates exposure instead of retarding it, and makes the shadow side of the object to be photographed less dense—in other words, softer—so as to bring it within perfect control to the operator.

By the actinic character of the rays thrown by the intercepter upon the shadow side of the sitter the rays passing therefrom to the sensitized plate exert a chemical action thereon which is as effective and which takes place in about the same time as that exerted by the side exposed to direct light, so that an almost instantaneous picture with soft shadows is the result.

I am aware that the covering of the walls and other accessories of a photographic studio with a non-actinic color, also the staining or coloring of the collodion film and of the bath, respectively, in actinic colors, each being taken singly and as a separate and disconnected step, have been used heretofore, and I therefore do not lay claim to the same, broadly; but I do claim the covering of the walls and other surroundings with a non-actinic color, and the coloring of the collodion film and bath by a color complementary to that of the surroundings, by which a conjoint action is obtained and the exposures are shortened and the shadows in the pictures softened.

Having thus described my invention, I claim as new and desire to secure by Letters Patent—

1. As an improvement in the art of photography, the process herein described of taking pictures with a view to shortening exposures and softening the shadows, which consists in covering the walls, background, and other accessories of the operating-room or studio with a non-actinic color, then coating the negative plate with a film of collodion of a color complementary to that of the walls and surroundings, and finally sensitizing the plate and exposing it to the action of the light in the usual manner, substantially as set forth.

2. As an improvement in the art of photography, the process herein described of taking pictures with a view to shortening exposures and softening shadows, which consists in covering the walls, background, and other accessories of the operating-room or studio with a non-actinic color, then coating the negative plate with a film of collodion of a color complementary to that of the surroundings, and finally sensitizing the plate in a bath of the same color as the plate and exposing said plate to the action of the light in the usual manner, substantially as described.

3. As an improvement in the art of photography, the described process of taking pictures with a view to shortening exposures and softening the shadows, which consists, essentially, in covering the walls, background, and other accessories of the operating-room or studio with an orange-pea-green color, then coating the negative plate with a film of violet-colored collodion, then sensitizing the plate in a bath of violet color, and finally exposing said plate to the action of the light in the usual manner, substantially as specified.

4. As an improvement in the art of photography, the described process of taking pictures with a view to shortening exposures and softening the shadows, which consists in covering the walls, background, and other accessories of the operating-room or studio with an orange-pea-green color, next interposing between the reflecting-walls and the object to be photographed an opaque screen or intercepter, then coating the negative plate with a film of violet-colored collodion, then sensitizing the plate in a bath of violet color, and finally exposing said plate to the action of the light in the usual manner, substantially as specified.

In testimony that I claim the foregoing as my invention I have signed my name, in presence of two witnesses, this 18th day of May, 1880.

DAVID NUNES CARVALHO.

Witnesses:
R. B. LAWRENCE,
MARCUS MARX.